United States Patent Office 3,138,509
Patented June 23, 1964

3,138,509
BONDING OF THERMOPLASTIC MATERIALS
Robert P. Cox, and Julia P. Bailey, Madison, Wis., assignors to Celanese Corporation of America, New York, N.Y., a corporation of Delaware
No Drawing. Filed July 28, 1960, Ser. No. 45,796
6 Claims. (Cl. 156—336)

This invention relates to the bonding of thermoplastic materials and particularly to the bonding of sheets of thermoplastic materials to each other at moderate temperatures and pressures.

In the formation of useful articles from sheets of thermoplastic material, it is often desirable to bond such sheets to each other for structural or decorative purposes. The bonding is usually accomplished by the application of an adhesive material to the surfaces of the sheets to be bonded, the positioning of the sheets in the position desired and the application of elevated temperatures and pressures to the positioned sheets to achieve a bond.

The satisfactory bonding of thermoplastic sheets to each other is difficult since satisfactory bonds must be free of cracks, warpage and bubbles and resistant to peeling. Many bonding processes produce bonds which are satisfactory in some respects but not in others. For example, high temperature bonding of cellulose acetate sheets often produces warping at the bonded surfaces while low temperature bonding is often subject to easy peeling. The satisfactory bonding of a pigmented or an embossed thermoplastic sheet to another thermoplastic sheet is particularly difficult since many adhesive materials tend to swell and distort a pigmented or an embossed pattern on the surface of a thermoplastic sheet.

It is an object of this invention to provide a method for the bonding of thermoplastic materials wherein bonds free of the foregoing defects are produced. Further objects will appear from the following description.

The objects of this invention are achieved by a method of bonding articles and particularly sheets of a thermoplastic material to each other which comprises applying to the surfaces to be bonded a dispersion of particles of said thermoplastic material in a liquid dispersion medium comprising a plasticizer for said thermoplastic material, and pressing said surfaces together. In addition to the plasticizer the liquid dispersion medium may also contain diluents. The preferred plasticizers are normally liquid materials capable of entering into a single phase solid admixture with the resin to the extent of at least 10 wt. percent of plasticizer based on the combined weight of resin and plasticizer.

The invention finds particular applicability in the bonding of cellulose acetate sheets and, for convenience will be described in connection with such bonding although it is to be understood that the invention is applicable to the bonding of sheets of other thermoplastic materials.

In the preparation of dispersions of cellulose acetate particles in liquid media comprising a plasticizer for the cellulose acetate (hereinafter referred to as cellulose acetate "plastisols"), the cellulose acetate must be reduced to relatively small particle size. The average particle size may vary from about 0.1 to about 50 microns, but preferably the average particles should be no larger than about 15 microns in diameter.

The weight ratio of resin particles to plasticizer will depend upon the nature of the resin and the plasticizer, the desired viscosity of the plastisol, whether or not a diluent is to be included and other factors. For most systems however, between about 2 and about 8 parts of plasticizer per part of resin, by weight, is suitable, with a preferred proportion being from about 3 to 5 parts of plasticizer per part of resin.

It is preferred to use a plasticizer which is relatively inactive with respect to the resin since an active plasticizer swells the resin particles easily and produces plastisols incapable of storage for extended periods. An active plasticizer also tends to distort the sheet surfaces upon application thereto. However, if desired, plastisols made from active plasticizers may be prepared and used if they are stored and applied at low temperatures. The term "active" plasticizer relates to the ability of the plasticizer to completely dissolve a given amount of resin at room temperature within a given time. With respect to cellulose acetate, for example, an "active" plasticizer is one which will form a clear solution containing 10% of its weight of cellulose acetate particles (16 mesh) at room temperature (with agitation) within five hours.

Suitable active plasticizers for cellulose acetate plastisols which meet the above definition include acetophenone, tris($\beta$-chloroethyl) phosphate, dimethyl phthalate and triethyl citrate. Dimethyl phthalate and triethyl citrate are preferred for the bonding of embossed sheets since they produce laminates having no visible distortion of the surface embossing. Ethoxyethyl acetate, methoxyethyl acetate and phenoxyethanol are active plasticizers which are less suitable for the purpose of this invention.

For easy application, and particularly for spray application, it may be desirable to include a diluent which is a non-solvent for the resinous particles. Suitable diluents for cellulose acetate plastisols include methanol, isopropanol, ethanol, methyl acetate, ethyl acetate, trichloroethylene, methylene chloride, propyl alcohol, carbon tetrachloride. The preferred diluents are isopropanol and carbon tetrachloride.

Certain diluent materials have a tendency to activate some plasticizers and thereby initiate gelling of the resin particles in the plastisol more easily than desired. Bonds prepared from such plastisols exhibit a slight graininess and tend to be weaker than bonds prepared from plastisols which are more difficult to gel. The tendency to gel may be corrected by maintaining and applying the plastisol at a low temperature, but preferably, a small amount of a hydrolyzing agent such as tetraethyl ammonium hydroxide is added to the plastisol to inhibit gelation. While it is not desired to be bound by any theory, it is believed that hydrolysis of the surface of the cellulose acetate particles causes the surface composition to be modified to approach that of cellulose and thereby inhibits premature gelation. Amounts of hydrolysis agent between about 0.025 and about 0.3 weight percent, based on the weight of plastisol, are suitable to inhibit premature gelation. If desired, the cellulose acetate particles may be pretreated for surface hydrolysis prior to their suspension in the dispersing agent.

The proportion of diluent in the plastisol will depend upon the viscosity desired, upon the nature and proportions of the resin and plasticizer and upon other factors. In general, from about one to about ten parts of diluent per part of plasticizer, by weight, are suitable, and preferably from about two and seven parts of diluent per part of plasticizer. The total liquid phase dispersion medium, including plasticizer and diluent is suitably from about 4 to about 30 parts by weight per part of resin particles.

The thermoplastic sheets to be bonded may be of any suitable thickness as for example from as little as 5 mils to as much as 250 mils, or more. The bonding of a large number of thermoplastic sheets into a single laminate structure may be achieved by successive or simultaneous bonding. The latter is preferred since it minimizes the opportunity for distortion.

In a preferred embodiment of this invention, one of the thermoplastic sheets has a pigmented or an embossed surface and the other is a clear, transparent sheet.

When the thermoplastic sheets are cellulose acetate sheets, they may conveniently be composed of cellulose acetate having an acetyl content from about 50% to about 62.5%, calculated as acetic acid. Plasticizers, such as triphenyl phosphate, dimethoxyethyl phthalate, diethylphthalate, and triethyl phosphate may be in the cellulose acetate sheets in amounts between about 10 and 35 weight percent, based on the total weight of the sheet.

The plastisol may be applied to the thermoplastic sheets in any suitable manner, as by knife, brush, roller or spray. The sheets are then placed into contact with each other and subjected to moderate pressures of from about 0.1 to about 600 p.s.i., at moderate temperatures of from about 30° to 120° C., for periods between about 15 minutes and about 24 hours. Table I below shows typical minimum curing times for a satisfactory bond with cellulose acetate plastisols utilizing the preferred plasticizers.

TABLE I

|  | Min. curing time at 50° C. | Min. curing time at 90° C. |
| --- | --- | --- |
|  | Hrs. | Hrs. |
| Cellulose acetate/dimethyl phthalate: |  |  |
| 1/3 | 8 | 1/2 |
| 1/4 | 8 | 1/4 |
| Cellulose acetate/triethyl citrate: |  |  |
| 1/3 | 8–24 | 1 |
| 1/4 | 2–3 | 1 |

Upon completion of the curing operation the sheets are fused in a bond which is resistant to separation by peeling, impact or transverse sawing.

*Examples I to VIII*

Cellulose acetate (54.7% acetyl, calculated as acetic acid) in the form of non-plasticized flake passing through a 40 mesh screen was ground to an average particle size of 15 microns, with 82% of the material passing through a 325 mesh screen.

One part of the thus ground powder was stirred with three parts by weight of 2-ethoxyethyl acetate at room temperature until the composition was uniform. The plastisol had a shelf life in excess of 24 hours.

Cellulose acetate sheets (54.7% acetyl, calculated as acetic acid, plasticized with 18.5% of diethyl phthalate and 7.5% of triphenyl phosphate) 0.16" thick, were cut into ½" x 2" strips. The sides were sanded and the ends were milled smooth and perpendicular to the sides. The above described plastisol was applied to the ends of a pair of strips and the strips were cured while held in abutting position between glass plates subjected to a pressure of 1/10 p.s.i. Three pairs of strips were tested under each of several conditions of cure. The impact (in foot pounds) necessary to break the bond was determined in a standard testing device with the 1/16" cross section presented to the striking hammer. The results were as follows:

TABLE II

| Example | Curing Conditions | Impact | |
| --- | --- | --- | --- |
|  |  | High | Average |
| I | ½ hr. at 50° C | 1.63 | 1.26 |
| II | 1 hr. at 50° C | 1.41 | 1.31 |
| III | 2½ hrs. at 50° C | 1.51 | 1.31 |
| IV | 16 hrs. at 50° C | 1.94 | 1.66 |
| V | ½ hr. at 30° C | 0.85 | 0.81 |
| VI | 1 hr. at 30° C | 0.92 | 0.81 |
| VII | 4½ hrs. at 30° C | 1.46 | 1.15 |
| VIII | 20 hrs. at 30° C | 1.50 | 1.42 |

*Examples IX to XIV*

The cellulose acetate particles of Example I (one part by weight) were blended with plasticizers and diluents and in the proportions shown in the table below. Butt joints were prepared and tested as described in Example I, except that curing was for 15 minutes at 90° C.

The results were as follows:

TABLE III

| Example | Plasticizer | Parts | Diluent | Parts | Impact | |
| --- | --- | --- | --- | --- | --- | --- |
|  |  |  |  |  | High | Average |
| IX | Ethoxyethyl Acetate | 3 | Methanol | 3 | 1.47 | 1.31 |
| X | do | 3 | Isopropanol | 3 | 0.94 | |
| XI | do | 3 | do | 2 | 1.33 | |
| XII | do | 3 | Ethanol | 3 | 1.21 | 1.02 |
| XIII | Methoxyethyl Acetate | 3 | Methanol | 4 | 2.00 | |
| XIV | Ethoxyethyl Acetate | 2 | Ethanol | 3 | 1.25 | |

*Example XV*

The plastisol of Example XII was modified by the inclusion of 0.05 wt. percent of tetraethyl ammonium hydroxide (TEAH). Butt joints were prepared and tested as in Example XII. The high impact strength value was 1.68 foot pounds and the average value was 1.47.

*Examples XVI to XVIII*

The cellulose acetate particles of Example I (one part by weight) were blended with the plasticizers and in the proportions shown in Table IV. Butt joints were prepared and tested as described in Examples IX to XIV, except that the curing temperature, in the case of Example XVIII was 107° C. The results were as follows:

TABLE IV

| Example | Plasticizer | Parts | Impact | |
| --- | --- | --- | --- | --- |
|  |  |  | High | Average |
| XVI | Triethyl Citrate | 2 | 1.02 | 0.90 |
| XVII | Acetophenone | 3 | 1.15 | 1.15 |
| XVIII | Dimethyl Phthalase | 3 | 1.92 | 1.59 |

Laminates were prepared from pairs of sheets of cellulose acetate measuring 3" x 7". The cellulose acetate sheets were similar in composition to the sheets used in Example I. One sheet of each pair was a clear, transparent sheet of 0.160" thickness and the other sheet was of 0.020" thickness, with a pigmented design produced upon it. Plastisols similar to those of Examples XVI and XVIII were applied to different pairs of sheets and the sheets were pressed together (pigmented side inward) at 1/10 p.s.i., for 15 minutes. The sheets to which the plastisol of Example XVI was applied were maintained at 90° C. during this time and the sheets to which the plastisol of Example XVIII was applied were maintained at 107° C. After 24 hours no surface attack on the pigmented pattern was visible.

It is to be understood that the foregoing detailed description is given merely by way of illustration and that many variations may be made therein without departing from the spirit of our invention.

Having described our invention what we desire to secure by Letters Patent is:

1. A method of bonding cellulose acetate sheets one to the other, which comprises spraying the surfaces to be bonded with an organosol in the form of a dispersion of finely divided cellulose acetate particles having an average particle size no larger than about 15 microns in a liquid phase dispersion medium comprising 2 to 8 parts of plasticizer per part of said particles and 1 to 10 parts of plasticizer diluent per part of said plasticizer, said plasticizer being characterized by the ability to form a clear solution containing 10% of its weight of said particles at room temperature with agitation within about 5 hours when said particles have a mesh size of about 16, said dispersion medium comprising said plasticizer and said diluent being present in an amount between 4 and 30 parts per part of said particles, and pressing said surfaces together.

2. A method of bonding cellulose acetate sheets one to the other, which comprises applying to the surfaces to be bonded a sprayable organosol in the form of a dispersion of finely divided cellulose acetate particles having an average particle size no larger than about 15 microns in a liquid phase dispersion medium comprising 2 to 8 parts of plasticizer per part of said particles, 1 to 10 parts of plasticizer diluent per part of said plasticizer and a hydrolyzing agent in an amount of between 0.025 and 0.3 percent by weight based on the total weight of particles and plasticizer, said plasticizer being characterized by the ability to form a clear solution containing 10% of its weight of said particles at room temperature with agitation within about 5 hours when said particles have a mesh size of about 16, said dispersion medium comprising said plasticizer and said diluent being present in an amount between 4 and 30 parts per part of said particles, and pressing said surfaces together.

3. A method of bonding cellulose acetate sheets one to the other, which comprises spraying the surfaces of be bonded with an organosol in the form of a dispersion of finely divided cellulose acetate particles having an average particle size no larger than about 15 microns in a liquid phase dispersion medium comprising 2 to 8 parts of plasticizer per part of said particles and 1 to 10 parts of plasticizer diluent per part of said plasticizer, said plasticizer being selected from the group consisting of acetophenone, tris(B-chloroethyl) phosphate, dimethyl phthalate, triethyl citrate, ethoxyethyl acetate, methoxyethyl acetate, and phenoxyethanol, said dispersion medium comprising said plasticizer and said diluent being present in an amount between 4 and 30 parts per part of said particles, and pressing said surfaces together.

4. A method of bonding cellulose acetate sheets as defined in claim 1, in which the sprayed and pressed sheets are subjected to pressures between about 0.1 to 600 p.s.i. at temperatures between about 30° and 120° C. for between about 15 minutes and 24 hours to produce a laminate.

5. A method of bonding cellulose acetate sheets as defined in claim 1, in which the cellulose acetate particles have an acetyl value, calculated as acetic acid, of approximately 54.7%.

6. A method of bonding cellulose acetate sheets as defined in claim 1, in which the plasticizer diluent is selected from the group consisting of methanol, isopropanol, ethanol, methyl acetate, ethyl acetate, trichloroethylene, methylene chloride, propyl alcohol and carbon tetrachloride.

References Cited in the file of this patent
UNITED STATES PATENTS

| | | |
|---|---|---|
| 1,815,444 | Moss | July 21, 1931 |
| 1,960,185 | Malm | May 22, 1934 |
| 2,809,120 | Sloan | Oct. 8, 1957 |
| 2,812,279 | Nadeau | Nov. 5, 1957 |